Figure 1:
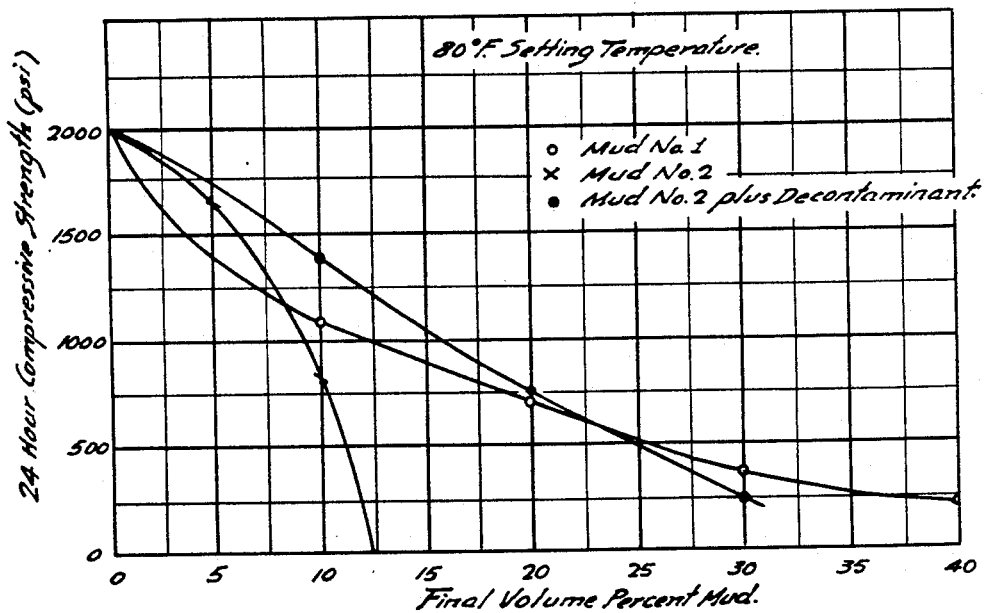

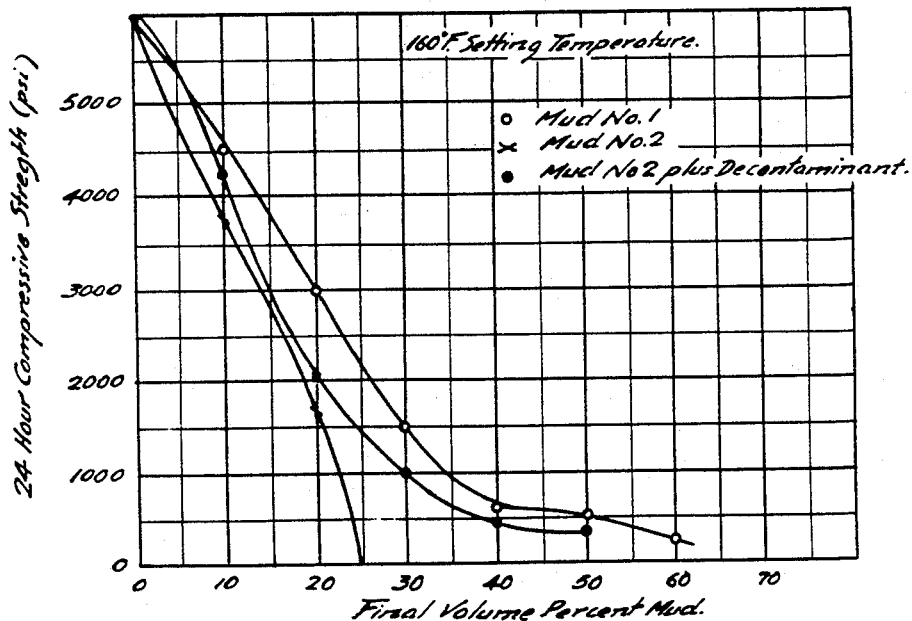
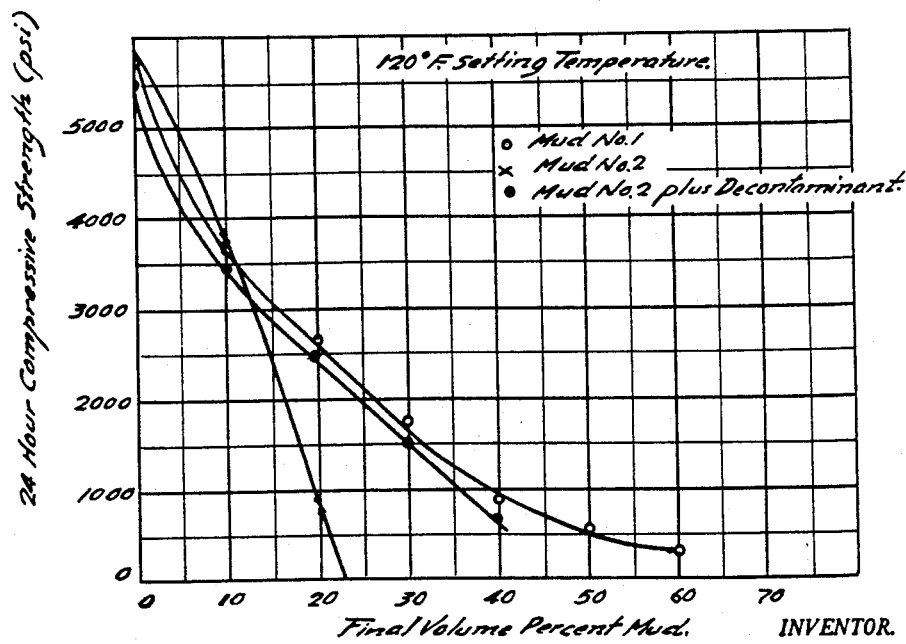

*Portland cement + formaldehyde or paraformaldehyde to a water soluble alkali metal or ammonium chromate or dichromate — to overcome bad effects of organic contam...*

United States Patent Office 2,889,228
Patented June 2, 1959

2,889,228

PROTECTION OF CEMENTS FROM EFFECTS OF CONTAMINATION

Horace J. Beach, Houston, Tex., assignor to Gulf Oil Corporation, Pittsburgh, Pa., a corporation of Delaware Application April 27, 1956, Serial No. 581,031

20 Claims. (Cl. 166—31)

This invention relates to cement compositions and particularly to compositions to be added to Portland cements to overcome the deleterious effects of organic contaminants which may be introduced into the cement and impair its setting characteristics and strength. The invention is especially useful for cements used in cementing oil and gas wells in which muds containing additives harmful to the cement have been used during the drilling of the well.

During the drilling of oil and gas wells with rotary equipment a thin slurry of mud is circulated down through the drill stem and back to the surface through the annular space surrounding the drill stem. Upon completion of part or all of the drilling it is often desirable to perform a cementing operation. The cementing may be a squeeze cementing operation in which the cement is forced into the formation, the setting of a plug in the well, or the cementing of casing.

In the cementing operations a neat slurry of cement is pumped down through tubing into the well and out against the formation. It is necessary that the time of setting of the cement be long enough to prevent setting of the cement in the tubing. The high temperatures and pressures existing in deep wells accelerate the rate of thickening of the cement which, combined with the added time required for pumping to the bottom of the well, makes a slow setting cement essential. However, it is important that the cement set and acquire strength as soon as possible after in place in the well to avoid delay of further work on the well.

The drilling muds circulated during the drilling of the well generally contain organic compounds added to the mud to reduce the viscosity of the mud and reduce the loss of fluid from the mud into the formations which have been drilled. Some mixture of the mud with the cement is certain to occur during the cementing operation. Mud that becomes mixed with the cement will decrease the strength of the cement by dilution and the resultant increase in the water to cement ratio. Additionally, many of the organic compounds added to the mud to give it the desired properties during drilling cause more serious loss of strength of the cement and increase in its thickening time than mere dilution. If the contamination of the cement with the organic additives is severe, the setting of the cement may be completely destroyed.

This invention resides in a novel composition which will eliminate or reduce the adverse effects upon the setting properties and the strength of cement resulting from contamination of the cement with certain organic compounds. It has been found that the addition of small amounts of formaldehyde to cement will counteract the effect of many organic compounds, particularly many of the organic additives used in drilling muds, which increase the setting time or decrease the strength of cements. In a preferred embodiment of this invention a mixture of formaldehyde or paraformaldehyde and a water soluble alkali metal or ammonium chromate or dichromate is added to the cement.

Figure 2:
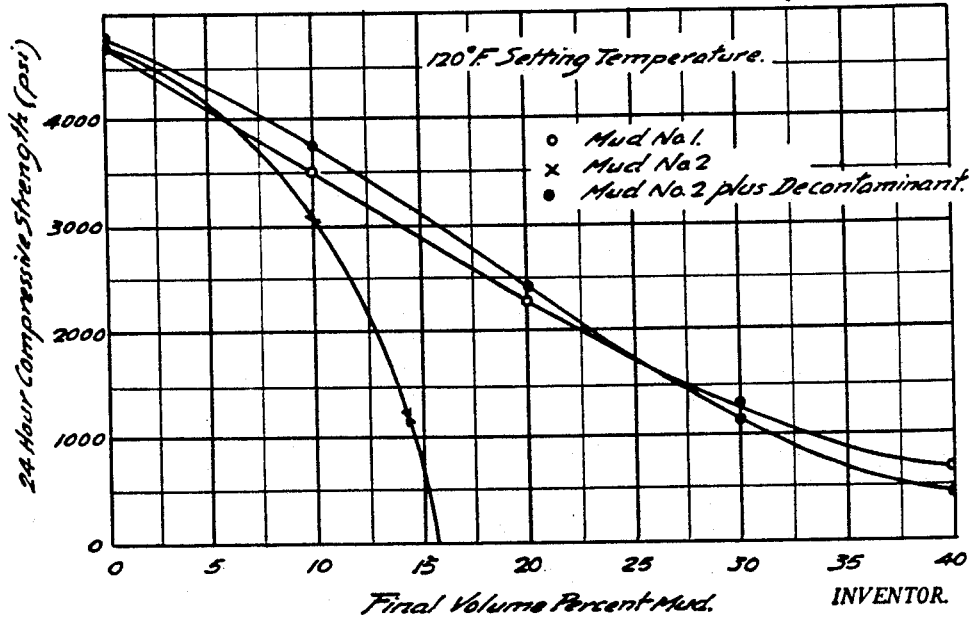

Figures 1, 2, 3, and 4 are graphs showing the strength of cements diluted with different amounts of mud at setting temperatures of 80° F., 120° F., 160° F., and 200° F., respectively. Separate curves in each of Figures 1, 2, 3, and 4 show the relationship between the strength of an unprotected cement and the amount of dilution with a mud containing no organic additives and a mud containing quebracho. A third curve in each of the graphs shows the relationship between the strength of the cement and the amount of dilution with a mud containing quebracho when the cement has been protected with the decontaminant of this invention.

The cements with which this invention is useful are, in general, designated as Portland cements. Among the preferred Portland cements which can be protected from the contaminating effects of organic compounds are the class A, class B, and class C cements defined in the API specification for oil well cements (API STD 10A, issued by the American Petroleum Institute). These cements correspond to ASTM type I, type II, and type III cements. This invention is especially valuable with class A common cement and is particularly useful where retarding of the setting of the cement because of contamination with organic drilling mud additives is a serious problem. In general, the retarding of the setting of the cement is not so severe in very deep wells because of the high temperatures and pressures existing therein which speed the setting. Throughout this specification the cements which advantageously may be compounded with the formaldehyde or formaldehyde and chromate mixture according to this invention are designated by the term "Portland cements."

The class A common cements are frequently modified by the manufacturers to increase the time available for pumping the cement. The modification may be by control of the surface area through controlled grinding of the cement, or by variation in the mineral constituents of the cement. Class A common cements so modified are identified by the term "unretarded slow set" cements. In addition to controlling the rate of set of class A common cements by control of the surface area and mineral composition of the cement small amounts of one or more retarding materials are added to further increase the thickening time. Good retarders allow controlled and useful increases in thickening times under conditions of high temperature and pressure but do not seriously reduce the rate of strength development of the cement. Poor retarders produce erratic effects both on working time and strength. The slow set cements to which retarders have been added are identified by the term "retarded slow set" cements. This invention is not useful with those retarded slow set cements with which the formaldehyde and sodium chromate tend to counteract the effect of the retarder. A notable exception is a retarded slow set cement in which the retarding agent is calcium lignosulfonate. The formaldehyde and sodium chromate mixture does not destroy the effects of the calcium lignosulfonate which is a good retarder allowing controlled increase in the thickening time of the cement. Whether the invention is useful with a particular retarded or unretarded slow set cement can only be determined by tests on the individual product.

Many of the organic compounds most commonly used to modify drilling muds, particularly to give them the desired viscosity and water loss characteristics, are also retarders which affect the setting time of Portland cements. Among the most widely used drilling mud additives are quebracho and other tannins, starch, sodium carboxy methylcellulose, lignite and modified lignin, such as calcium and monovalent salts of lignosulfonic acid. The additives listed can be used singularly, or in mixtures of two or more of the additives, and may be mixed with inorganic compounds such as caustic and lime. If excessive amounts of these materials are mixed with cement slurries the setting of the cement may be completely destroyed. With the exception of calcium lignosulfonate, the organic drilling mud additives listed are generally considered poor retarders.

Formaldehyde is preferably added directly to the slurry of cement rather than to dry cement in order to facilitate mixing. A water solution of formaldehyde is a convenient form in which the formaldehyde can be added to the cement. The concentration of the formaldehyde in the water solution is not important if the amount of water in the formaldehyde solution is small compared to the amount of water in the cement slurry.

Paraformaldehyde can be used as a decontaminant instead of the formaldehyde and generally references to formaldehyde in this application include formaldehyde and paraformaldehyde. Paraformaldehyde readily available in commercial production is a dry powder which is a mixture of polyoxymethylene glycols. It is believed that the paraformaldehyde is quickly depolymerized and hydrolyzed in the alkaline cement slurry to yield formaldehyde. The term "formaldehyde" is used in a generic sense in the specification and claims of this application and includes formaldehyde and paraformaldehyde within its scope. Paraformaldehyde is a preferred decontaminant because of its solid, relatively stable form which allows it to be mixed directly with dry cement.

Formaldehyde alone or paraformaldehyde alone is effective as a decontaminant if the cementing operation is performed at temperatures of about 180° F. or higher. The addition of 0.6% monomeric formaldehyde in an aqueous solution to a class A common Portland cement contaminated with as much as 2% of one or more of quebracho, sodium lignosulfonate, calcium lignosulfonate, pre-gelatinized starch and sodium carboxy methylcellulose has been found to cancel the thickening time increase of the cement at temperatures of 180° F. The tests were made in a Halliburton type consistometer, which consists of apparatus adapted to stir the cement and measure its viscosity until setting occurs. Identical results were obtained when paraformaldehyde was substituted for the monomeric form. A concentration in the cement of 2.0% of the contaminant is far higher than any concentration of the contaminant that is likely to be encountered during the cementing operations. For example, a 40% dilution of the cement by a mud containing 4 pounds per barrel of an additive will add only 0.4% by weight of the additive, based on the weight of the dry cement.

At lower tempeartures, the formaldehyde or paraformaldehyde alone does not fully counteract the set retarding effects of the contaminant. It has been found, however, that the addition of a mixture of a water soluble chromate or dichromate and formaldehyde or paraformaldehyde to the cement will substantially reduce or eliminate the effects of the organic contaminants at lower temperatures. Preferred water soluble chromates and dichromates are those of the alkali metal, magnesium and ammonium ions. Sodium chromate is particularly suitable for admixture with formaldehyde or paraformaldehyde because of its low deliquescence and availability.

The ratio of the formaldehyde to the chromate or dichromate is not critical. When formaldehyde and sodium chromate are used the ratio of formaldehyde to sodium chromate can range from 30:1 to 1:2. Most effective ratios are in the range of 3:1 to 1:1 when the amount of formaldehyde used is 0.6% of the dry cement. When chromates or dichromates other than those of sodium are used, the ratios should be adjusted to compensate for the percentage change in composition so that the amount of chromium is unchanged. A preferred mixture for use in this invention contains three parts by weight of paraformaldehyde to two parts by weight of sodium chromate.

Formaldehyde is added to the cement in effective amounts up to about 3% of the weight of the dry cement both when formaldehyde alone and when a mixture of formaldehyde and a chromate are used as decontaminants. The minimum concentration of formaldehyde used is usually about 0.25%. Lower concentrations have some decontaminating effect, but contamination that can be counteracted by concentrations of formaldehyde less than about 0.25% ordinarily does not seriously impair the setting characteristics of the cement. It has been found that one pound of the mixture of three parts of paraformaldehyde and two parts of sodium chromate per 94 pound sack of cement is sufficient in practically all instances to counteract contaminants which may be introduced into the cement from the drilling mud. Larger amounts of the decontaminant can be used but there is no additional gain in final strength except in the rare instances in which 1.0 lb./sack is not sufficient. At concentrations of three pounds of the decontaminant per 94 pound sack of cement, which concentrations are higher than are likely to be required, the decontaminant has no deleterious effect on the strength of the cement.

In oil well cementing, a neat slurry of cement is pumped down the well to the formation to be cemented and allowed to remain in place until setting has proceeded far enough to give the cement sufficient strength for further operations. In plug setting operations, a section of the hole is filled with the cement slurry; in squeeze cementing the slurry is forced by pressure into the formation; and in cementing casing the cement is pumped down through the casing to its lower end and up into the space surrounding the casing. Conventionally, the concentration of cement slurries is expressed in percent, the percent being the number of pounds of water per 100 pounds of dry cement. About 40 to 55 percent slurries are used in the cementing.

EXAMPLE 1

The effectiveness of the decontaminant in overcoming the adverse effects of organic drilling mud additives on the strength of cement is illustrated by the following tests in which several of the most widely used drilling mud additives were added directly to the cement.

One percent of the drilling mud additive was added directly to a 46% neat cement slurry. The percent of drilling mud additive is based on the weight of dry cement. Tests were run at 180° F. and 120° F. on unprotected cement slurries and also on cement slurries protected by the decontaminant of this invention. The results of the tests are set forth in Table I. In all instances the decontaminant was a mixture of paraformaldehyde and sodium chromate in proportions of 3 parts by weight of paraformaldehyde and 2 parts by weight of sodium chromate.

Table I.—*Effect of formaldehyde and sodium chromate on strength of contaminated cement*

180° F.

| Contaminant Per Cent of Dry Cement | Decontaminant, Lbs./Sack of Cement | Aging Time, Days | Compressive Strength, p.s.i. |
|---|---|---|---|
| 1.0 quebracho | 0 | 1 | 0 |
| Do | 2.0 | 1 | 3,520 |
| 1.0 mangrove bark | 0 | 1 | 0 |
| Do | 1.0 | 1 | 3,750 |
| 1.0 hemlock extract | 0 | 1 | 0 |
| Do | 4.0 | 1 | 2,290 |
| 1.0 redwood extract | 0 | 1 | 0 |
| Do | 2.0 | 1 | 2,330 |
| 1.0 tara | 0 | 1 | 0 |
| Do | 2.0 | 1 | 2,820 |
| 0.6 Na CMC | 0 | 1 | 135 |
| 0.6 Na CMC | 1.0 | 1 | 2,080 |
| 1.0 calcium lignosulfonate | 0 | 1 | 0 |
| Do | 1.0 | 1 | 0 |
| Do | 2.0 | 1 | 0 |
| Do | | 2 | 3,125 |
| Do | 1.0 | 2 | 2,720 |
| Do | 2.0 | 2 | 2,656 |

120° F.

| | | | |
|---|---|---|---|
| 1.0 quebracho | 0 | 1 | 0 |
| Do | 2.0 | 1 | 2,760 |
| 1.0 mangrove bark | 0 | 1 | 2,190 |
| Do | 1.0 | 1 | 3,530 |
| 1.0 hemlock extract | 0 | 1,4 | 0 |
| Do | 1.0 | 1 | 0 |
| Do | 1.0 | 2 | 320 |
| Do | 2.0 | 1 | 2,020 |
| 1.0 redwood extract | 0 | 1 | 0 |
| Do | 1.0 | 1 | 75 |
| Do | 2.0 | 1 | 2,190 |
| 1.0 tara | 0 | 1 | 0 |
| Do | 3.0 | 1 | 2,840 |

The results in Table I show directly the effect of the decontaminant in overcoming the adverse effects of the drilling mud additive on the cement. The tests did not simulate actual contamination that is experienced in the cementing of oil wells because there was no dilution of the cement with mud resulting in an increase in the water to cement ratio. However, the concentration of 1% of the drilling mud additive is much higher than will be encountered during the cementing of a well. It will be noticed that contrary to the results obtained with formaldehyde alone at temperatures of about 180° F. the mixture of paraformaldehyde and sodium chromate did not counteract the set retarding effect of calcium lignosulfonate.

EXAMPLE 2

A series of tests was run which more closely approximates conditions encountered in the cementing of oil wells. A mud was prepared by forming a 6% bentonite in water suspension. The suspension is referred to as mud No. 1. Mud No. 1 was thoroughly mixed with a 46% neat cement slurry, cubes of the mixture were formed, and the strength of the cubes determined after aging 24 hours at 80°, 120°, 160°, and 200° F. Separate cubes were prepared for different concentrations of mud in the cement. The results obtained, presented in Figures 1, 2, 3, and 4, illustrate the effect of dilution of the cement slurry with mud upon the strength of the set cement.

EXAMPLE 3

A second mud, referred to as mud No. 2, similar to mud No. 1 but containing 4 pounds per barrel of quebracho and ½ pound per barrel of caustic was prepared and the test described above repeated. The mud containing quebracho shows the effects of the dilution of the cement with the mud plus contamination of the cement with the quebracho. Quebracho was chosen for the mud additive because it is the most commonly used of the tannins which are the largest class of additives for drilling muds.

EXAMPLE 4

Another series of tests was made in which cement was protected by the addition of one pound of decontaminant consisting of 3 parts paraformaldehyde and 2 parts sodium chromate per 94 pound sack of cement and then mixed with mud No. 2. The series of tests covered temperatures ranging from 80° F. to 200° F. and mud concentrations in the cement from 0 to 50%.

The 24 hour strengths of the cements prepared in Examples 2, 3, and 4 are plotted as ordinates and the mud concentration as the abscissa in Figures 1, 2, 3, and 4. The results of the above tests show that the addition of the decontaminant to the cement resulted in the cement contaminated with quebracho having a 24 hour compressive strength substantially the same as the cement diluted by mud but not contaminated with quebracho. The advantages of the decontaminant are especially apparent when there has been a substantial dilution, above about 10%, of the cement with mud. It is at the higher degrees of contamination that the effects of the drilling mud additives are most severe and may completely prevent setting of the cement.

EXAMPLE 5

A 46% neat class A common cement slurry was mixed with 40% of a field mud of the lime treated type. The field mud was heavily treated, having the following composition:

3 pounds per barrel quebracho
3 pounds per barrel caustic
7 pounds per barrel lime
2 pounds per barrel lignite
2 pounds per barrel sodium carboxy methylcellulose The high concentration of the additives in the mud and the high proportion of mud in the mix resulted in an extremely severe contamination of the cement. The cement, when unprotected with the decontaminant did not set after 14 days aging at 120° F. The results of the addition of decontaminant to the cement are presented in Table II. The decontaminant consisted of three parts paraformaldehyde to two parts sodium chromate.

Table II.—*Effect of formaldehyde and sodium chromate on strength of contaminated cement*

120° F.

| Volume Percent Mud No. 3 [1] | Decontaminant, Lbs./Sack of Cement | Aging Time, Days | Compressive Strength, p.s.i. |
|---|---|---|---|
| 40 | 0 | 1 | 0 |
| 40 | 0 | 7 | 0 |
| 40 | 0 | 14 | 0 |
| 40 | 1.0 | 1 | 100 |
| 40 | 1.0 | 2 | 1,140 |
| 40 | 2.0 | 1 | 1,140 |

[1] Composition of Mud No. 3: 3 lbs./bbl. quebracho; 3 lbs./bbl. caustic; 7 lbs./bbl. lime; 2 lbs./bbl. lignite; 2 lbs./bbl. sodium carboxy methylcellulose.

Calcium lignosulfonate is a commonly used additive for drilling muds which also is a good retarder for incorporation in cements to form a retarded slow set cement from a class A common cement. The effects of the calcium lignosulfonate on the setting of the cement are not counteracted by the decontaminant mixtures of formaldehyde and chromate of this invention. This unique property is advantageous in allowing the use of the decontaminant with cements retarded with calcium lignisulfonate. The addition of calcium lignosulfonate to class A cements allows the preparation of cements suitable for use at depths for which the class D and class E cements are specified. The addition of the formaldehyde and chromate of this invention to class A cements retarded with calcium lignosulfonate counteracts the effect of contaminants other than calcium lignosulfonate introduced from the drilling mud without destroying the desired and controllable set retarding effects of the calcium lignosulfonate.

EXAMPLE 6

Test cubes were prepared from mixtures of a 46% neat class A common cement which had been retarded with calcium lignosulfonate, and varying amounts of mud No. 2. In order to show the effect of the decontaminant, comparative tests were run for unprotected and protected cements. A series of runs was also made with a cement contaminated with pre-gelatinized starch. The results of the tests are presented in Table III.

Table III.—*Effects of formaldehyde and sodium chromate on contaminated cement retarded by calcium lignosulfonate*

130° F.

| Percent Calcium Lignosulfonate | Contaminant | Decontaminant[1] Lbs./Sack of Cement | Curing Time, Days | Compressive Strength, p.s.i. |
|---|---|---|---|---|
| 0.20 | 20% Mud No. 2 | 0 | 1 | 0 |
| 0.20 | do | 1.0 | 1 | 1,820 |
| 0.20 | do | 1.0 | 2 | 2,525 |
| 0.30 | do | 1.0 | 1 | 1,650 |
| 0.30 | do | 1.0 | 2 | 2,250 |
| 0.30 | 30% Mud No. 2 | 1.0 | 1 | 865 |
| 0.40 | do | 0 | 1 | 0 |
| 0.40 | do | 0 | 7 | 0 |
| 0.40 | do | 1.0 | 1 | 110 |
| 0.40 | do | 0 | 1 | [2] 0 |
| 0.40 | do | 1.0 | 1 | [2] 740 |
| 0.40 | 0.5% pre-gelatinized starch | 0 | 1 | 0 |
| 0.40 | | 1.0 | 1 | 1,688 |

[1] 3 parts of paraformaldehyde to 2 parts of sodium chromate.
[2] Cured under 3000 p.s.i. and at 170° F.

The results of addition of the formaldehyde and water soluble chromate decontaminant of this invention to cements contaminated with calcium lignosulfonate are shown in Table I. The decontaminant does not counteract the effect of the calcium lignosulfonate. However, the contaminating effects of other organic compounds introduced into the cement by mixing with a drilling mud are counteracted by the decontaminant, as shown in Table III. This unique property of the decontaminant allows their use with Portland cements which have been retarded by the addition of calcium lignosulfonate to overcome the effects of organic compounds other than calcium lignosulfonate.

Accelerators which shorten the thickening time and speed the rate of strength development are often added to cements. If the action of the decontaminant of this invention was only the action of the usual accelerators, the strength tests presented in the previous examples might be misleading. The gain in strength might be the result of the cement reaching its maximum strength more rapidly rather than the result of counteracting the decontaminants.

EXAMPLE 7

In order to ascertain if the decontaminant acts as an accelerator, the decontaminant was mixed with class A common cements and class A cements retarded with calcium lignosulfonate and a series of casing setting and squeeze simulation tests were made. The tests employed a Stanolind high pressure consistometer and followed the procedure outlined in API code RP 10–B in detail. The thickening times are set forth in Tables IV and V.

Table IV.—*Simulated squeeze cementing tests 46% class A cement slurries*

BRAND A COMMON CEMENT

| Test Depth (feet) | Decontaminant,[1] lbs./Sack Cement | Initial Viscosity (poise) | Time to 100 poises |
|---|---|---|---|
| 2,000 | 0 | 20 | 3 hrs.—18 mins. |
| 2,000 | 1.0 | 22 | 3 hrs.—4 mins. |
| 4,000 | 0 | 18 | 1 hr.—40 mins. |
| 4,000 | 1.0 | 20 | 1 hr.—44 mins. |
| 6,000 | 0 | 20 | 1 hr.—14 mins. |
| 6,000 | 1.0 | 20 | 1 hr.—12 mins. |

BRAND B COMMON CEMENT

| 2,000 | 0 | 13 | 3 hrs.—8 mins. |
| 2,000 | 1.0 | 11 | 3 hrs.—11 mins. |
| 2,000 | 2.0 | 12 | 3 hrs.—38 mins. |
| 4,000 | 0 | 13 | 1 hr.—51 mins. |
| 4,000 | 1.0 | 12 | 2 hrs.—13 mins. |
| 6,000 | 0 | 14 | 1 hr.—20 mins. |
| 6,000 | 1.0 | 14 | 1 hr.—10 mins. |

[1] 3 parts of paraformaldehyde to 2 parts of sodium chromate.

Table V.—*Simulated casing setting tests 46% class A cement slurries retarded by calcium lignosulfonate*

BRAND A COMMON CEMENT

| Percent Calcium Lignosulfonate | Decontaminant, Lbs./Sack of Cement | Test Depth (feet) | Time to 100 poises |
|---|---|---|---|
| 0.60 | 0 | 14,000 | 5 hrs.—0 mins. |
| 0.60 | 1.0 | 14,000 | 4 hrs.—41 mins. |

BRAND B COMMON CEMENT

| 0.20 | 0 | 10,000 | 1 hr.—50 mins. |
| 0.20 | 1.0 | 10,000 | 1 hr.—42 mins. |
| 0.30 | 1.0 | 10,000 | 2 hrs.—3 mins. |
| 0.40 | 0 | 14,000 | 2 hrs.—50 mins. |
| 0.40 | 1.0 | 14,000 | 2 hrs.—42 mins. |
| 0.60 | 0 | 14,000 | 4 hrs.—0 mins. |
| 0.60 | 1.0 | 14,000 | 4 hrs.—4 mins. |

BRAND C COMMON CEMENT

| 0.40 | 0 | 14,000 | 2 hrs.—10 mins. |
| 0.40 | 1.0 | 14,000 | 2 hrs.—7 mins. |

The results of the tests show no shortening of thickening times of uncontaminated cements, thereby indicating that the effect of the decontaminant is to counteract the contaminants.

This invention provides a composition and method for counteracting the set retarding and strength impairment effects of organic compounds on Portland cements. The decontaminants of this invention are particularly useful in plug setting and liner cementing operations in the completion of oil and gas wells. It is in those operations that contamination of the cement presents the most serious problem. Other operations in which this invention is useful are squeeze cementing for water or gas shut-off, or in any cementing operations where contamination occurs. The cementing compositions of this invention can also be used in the cementing of casing; however, the flushing action resulting from pumping the large amount of cement employed through the annulus ordinarily prevents serious contamination of the cement.

I claim:

1. A neat cement slurry composition for cementing of oil and gas wells consisting essentially of Portland cement, formaldehyde and water, the formaldehyde being present in amounts below about 3% of the weight of the Portland cement effective to counteract contamination of the cement with organic contaminants and the amount of water being about 40 to 55% by weight of the cement.

2. A composition for addition to Portland cement to counteract the effects of contamination of Portland cement with organic compounds consisting essentially of formaldehyde and a compound selected from the group consisting of water soluble chromates and water soluble dichromates, the ratio of formaldehyde to the compound being in the range of about 30:1 to 1:2.

3. A composition as set forth in claim 2 in which the compound is an alkali metal chromate.

4. A composition as set forth in claim 2 in which the compound is an alkali metal dichromate.

5. A composition as set forth in claim 2 in which the compound is sodium chromate.

6. A composition as set forth in claim 2 in which the compound is sodium dichromate.

7. A composition as set forth in claim 2 in which the compound is magnesium chromate.

8. A composition as set forth in claim 2 in which the compound is ammonium chromate.

9. A composition for addition to Portland cements to counteract contamination of the cements with organic compounds consisting essentially of paraformaldehyde and sodium chromate, the ratio of paraformaldehyde to sodium chromate, being in the range from 30:1 to 1:2.

10. A cement composition consisting essentially of Portland cement, formaldehyde, and a compound selected from the group consisting of water soluble chromates and water soluble dichromates, the formaldehyde being present in the cement composition in amounts below about 3% effective to counteract contamination of the cement with organic compounds, and the ratio of the formaldehyde to the compound being in the range of 30:1 to 1:2.

11. A cement composition as set forth in claim 10 in which the compound is sodium chromate.

12. A process for the cementing of oil and gas wells comprising pumping a slurry consisting essentially of water, Portland cement, formaldehyde and a compound selected from the group consisting of water soluble chromates and water soluble dichromates into a well containing a drilling mud containing organic drilling mud additives, the amount of formaldehyde being about 0.25 to 3.0% of the weight of the Portland cement and the ratio of the formaldehyde to the compound being in the range of 30:1 to 1:2, forcing the slurry into the space to be cemented, and maintaining the slurry in the space to be cemented until the cement sets.

13. A cement composition consisting essentially of class A Portland cement retarded with calcium lignosulfonate, formaldehyde and a compound selected from the group consisting of water soluble chromates and water soluble dichromates, the amount of formaldehyde being about 0.25 to 3.0% of the weight of the Portland cement and the ratio of the formaldehyde to the compound being in the range of 30:1 to 1:2.

14. A pumpable cement slurry consisting essentially of Portland cement, water, formaldehyde, and a compound selected from the group consisting of water soluble chromates and water soluble dichromates, the amount of water being about 40 to 55% by weight of the solid constituents of the slurry the formaldehyde being present in amounts below about 3% effective to counteract contamination of the cement with organic compounds, and the ratio of the formaldehyde to the compound being in the range of 30:1 to 1:2.

15. A process for cementing oil and gas wells containing a drilling mud containing organic drilling mud additives which retard the set of cements comprising forming a pumpable cement slurry consisting essentially of Portland cement, water, formaldehyde and a water soluble compound selected from the group consisting of alkali metal chromates and alkali metal dichromates, the amount of formaldehyde in the slurry being about 0.25 to 3.0% of the weight of the Portland cement and the ratio of the formaldehyde to the water soluble compound being in the range of 30:1 to 1:2, pumping the slurry into the well, forcing the cement into the space to be cemented and maintaining the slurry in the space to be cemented until the cement sets.

16. A cement composition consisting essentially of a Portland cement, about 0.25 to 3.0% paraformaldehyde based on the weight of the Portland cement and a compound selected from the group consisting of water soluble chromates and water soluble dichromates, the ratio of paraformaldehyde to the compound being in the range of 30:1 to 1:2.

17. A cement composition consisting essentially of class A Portland cement, about 0.25 to 3.0% formaldehyde based on the weight of the Portland cement, and a compound selected from the group consisting of water soluble chromates and water soluble dichromates, the ratio of formaldehyde to the compound being in the range of 30:1 to 1:2.

18. A cement composition consisting essentially of Portland cement, paraformaldehyde, and sodium chromate, the concentration of the paraformaldehyde being about 0.6% based on the weight of the dry Portland cement and the weight ratio of the paraformaldehyde to the sodium chromate being about 3:2.

19. A process for the cementing of oil and gas wells at temperatures above about 180° F. comprising pumping a neat cement slurry consisting essentially of about 40 to 55% water, Portland cement, and about 0.25 to 3.0% formaldehyde into a well at least partially filled with a drilling mud containing organic drilling mud additives, forcing the neat cement slurry into the space to be cemented, and maintaining the neat cement slurry in the space to be cemented until the cement sets, the amounts of water and formaldehyde being expressed in percent by weight of the dry cement.

20. A cement composition consisting essentially of Portland cement, formaldehyde, and sodium chromate, the formaldehyde constituting 0.6% by weight of the Portland cement, and the ratio of formaldehyde to sodium chromate being in the range of 3:1 to 1:1.

References Cited in the file of this patent

UNITED STATES PATENTS

| | | |
|---|---|---|
| 2,053,842 | Rice | Sept. 8, 1936 |
| 2,582,459 | Salathiel | Jan. 15, 1952 |

FOREIGN PATENTS

| | | |
|---|---|---|
| 405,508 | Great Britain | Feb. 8, 1934 |
| 488,550 | Great Britain | July 11, 1938 |
| 876,383 | France | Nov. 4, 1942 |
| 884,921 | France | Apr. 31, 1943 |